United States Patent [19]

Weder et al.

[11] Patent Number: 5,339,601
[45] Date of Patent: Aug. 23, 1994

[54] DECORATIVE COVER WITH BAND

[75] Inventors: Donald E. Weder, Highland; William F. Straeter, Breese; Michael J. King, Staunton, all of Ill.

[73] Assignee: Highland Supply Corporation, Highland, Ill.

[21] Appl. No.: 949,175

[22] Filed: Sep. 22, 1992

Related U.S. Application Data

[63] Continuation-in-part of Ser. No. 926,098, Aug. 5, 1992, which is a continuation-in-part of Ser. No. 819,311, Jan. 9, 1992, abandoned, which is a continuation-in-part of Ser. No. 876,947, May 1, 1992.

[51] Int. Cl.$^5$ .................. B65B 11/02; B65B 51/06; B65B 51/08; B21D 35/00
[52] U.S. Cl. .................. 53/397; 53/399; 53/414; 53/415; 53/417; 53/419; 29/469.5
[58] Field of Search .................. 53/397, 399, 414, 415, 53/419, 410, 449, 417; 29/469.5

[56] References Cited

U.S. PATENT DOCUMENTS

| | | |
|---|---|---|
| D. 295,525 | 5/1988 | Sakaki et al. . |
| 27,744 | 8/1873 | Billette et al. . |
| 31,353 | 8/1883 | Cheung . |
| 1,375,479 | 4/1921 | Van Allen . |
| 1,994,962 | 3/1935 | Rushfeldt . |
| 2,026,282 | 12/1935 | Leguillon . |
| 2,049,030 | 7/1936 | Strauss . |
| 2,133,278 | 10/1938 | Brogden . |
| 2,152,648 | 4/1939 | Jones . |
| 2,209,778 | 7/1940 | Krasowski . |
| 2,236,936 | 4/1941 | Camp . |
| 2,274,526 | 2/1942 | Bunn . |
| 2,302,259 | 11/1942 | Rothfuss . |
| 2,367,168 | 1/1945 | Cheesman . |
| 2,373,634 | 4/1945 | Wagner . |
| 2,514,038 | 7/1950 | Doolittle . |
| 2,882,660 | 4/1959 | Denton . |
| 3,015,916 | 1/1962 | Denton . |
| 3,078,631 | 2/1963 | Seserman . |
| 3,104,937 | 9/1963 | Wyckoff et al. . |
| 3,125,907 | 3/1964 | Derrickson . |
| 3,126,686 | 3/1964 | Kobylanski et al. . |
| 3,129,728 | 4/1964 | Sharko . |
| 3,134,679 | 5/1964 | Dreyfus ................ 53/397 |
| 3,135,192 | 6/1964 | Derrickson . |
| 3,152,539 | 10/1964 | Sorensen . |
| 3,163,899 | 1/1965 | Karass . |
| 3,164,372 | 1/1965 | Derrickson . |
| 3,186,333 | 6/1965 | Hoffman et al. . |
| 3,189,060 | 6/1965 | Attas . |
| 3,192,584 | 7/1965 | Pape . |
| 3,204,312 | 9/1965 | Derrickson et al. . |
| 3,224,363 | 12/1965 | Talbot . |
| 3,246,446 | 4/1966 | Powers ................ 53/414 X |
| 3,251,295 | 5/1966 | Dickens . |
| 3,258,221 | 6/1966 | Derrickson et al. . |
| 3,263,599 | 8/1966 | Dickens . |
| 3,264,022 | 8/1966 | Talbot . |
| 3,279,354 | 10/1966 | Dickens et al. . |
| 3,316,687 | 5/1967 | Bartlett, Jr. . |
| 3,318,230 | 5/1967 | Hilton . |
| 3,322,325 | 5/1967 | Bush ................ 53/419 X |
| 3,324,217 | 6/1967 | Armstrong et al. . |
| 3,368,323 | 2/1968 | Wood . |
| 3,393,633 | 7/1968 | Hoffman et al. . |
| 3,545,723 | 12/1970 | Raley . |

(List continued on next page.)

FOREIGN PATENT DOCUMENTS 1084888 10/1953 France .
158098 4/1920 United Kingdom .

OTHER PUBLICATIONS

Rubber Band Technology, Ltd., Yakima, Wash. Bandmaster 102 Model AF, Form RBT Sep. 1988.

(List continued on next page.)

*Primary Examiner*—Horace M. Culver
*Attorney, Agent, or Firm*—Dunlap, Codding & Lee

[57] ABSTRACT

A decorative covering for a flower pot where a sheet of material is extended about an outer peripheral surface of the flower pot and a band is secured about a portion of the sheet of material to form a crimped portion in the sheet of material for cooperating to hold the sheet of material in the position extending about the flower pot to provide the decorative covering.

18 Claims, 1 Drawing Sheet

U.S. PATENT DOCUMENTS

| | | |
|---|---|---|
| 3,554,846 | 1/1971 | Billett . |
| 3,612,480 | 10/1971 | Guy . |
| 3,612,481 | 10/1971 | Guy . |
| 3,636,861 | 1/1971 | Weller . |
| 3,639,530 | 2/1972 | Ryan . |
| 3,662,790 | 5/1972 | Styner . |
| 3,691,939 | 9/1972 | Goodley . |
| 3,709,758 | 1/1973 | Gilmore . |
| 3,750,239 | 8/1973 | Styner . |
| 3,759,169 | 9/1973 | Goodley . |
| 3,783,079 | 1/1974 | Wehr . |
| 3,799,835 | 3/1974 | Gilmore . |
| 3,826,443 | 7/1974 | Goodley . |
| 3,841,213 | 10/1974 | Goodley . |
| 3,847,071 | 11/1974 | Goodley . |
| 3,851,683 | 12/1974 | Glaus et al. . |
| 3,867,806 | 2/1975 | Lancaster, III et al. . |
| 3,873,387 | 3/1975 | Schoening . |
| 3,896,525 | 7/1975 | Stewart, Jr. et al. . |
| 3,928,939 | 12/1975 | Edwards et al. . |
| 3,949,662 | 4/1976 | Woomer . |
| 3,962,503 | 6/1976 | Crawford ............ 53/397 X |
| 3,963,191 | 6/1976 | Goodley . |
| 3,984,278 | 10/1976 | Styner et al. . |
| 3,995,409 | 12/1976 | Discavage et al. . |
| 4,005,647 | 2/1977 | Goodley et al. . |
| 4,020,756 | 5/1977 | Weiss . |
| 4,020,879 | 5/1977 | Billett et al. . |
| 4,062,918 | 12/1977 | Nakanose . |
| 4,090,008 | 5/1978 | Haley . |
| 4,093,146 | 6/1978 | Haley . |
| 4,096,019 | 6/1978 | Lehmann . |
| 4,101,625 | 7/1978 | Haley . |
| 4,137,788 | 2/1979 | Fischer . |
| 4,152,475 | 5/1979 | Haley . |
| 4,216,620 | 8/1980 | Weder . |
| 4,220,493 | 9/1980 | Wehr et al. . |
| 4,223,704 | 9/1980 | Glaus . |
| 4,227,949 | 10/1980 | Wehr . |
| 4,252,158 | 2/1981 | McDade . |
| 4,253,227 | 3/1981 | Bullington . |
| 4,254,703 | 3/1981 | Fulton et al. . |
| 4,297,811 | 11/1981 | Weder . |
| 4,300,312 | 11/1981 | Weder . |
| 4,300,976 | 11/1981 | Wehr . |
| 4,328,742 | 5/1982 | Discavage . |
| 4,383,881 | 5/1983 | Sakai . |
| 4,401,020 | 8/1983 | Brux . |
| 4,444,097 | 4/1984 | Wehr et al. . |
| 4,450,032 | 5/1984 | Wehr et al. . |
| 4,454,808 | 6/1984 | Wehr et al. . |
| 4,483,516 | 11/1984 | Wehr . |
| 4,533,046 | 8/1985 | Kuhnert et al. . |
| 4,536,248 | 8/1985 | Bullington et al. . |
| 4,544,779 | 11/1985 | Fischer . |
| 4,579,027 | 4/1986 | Lewis . |
| 4,601,155 | 7/1986 | Lewis . |
| 4,635,542 | 1/1987 | Sebelist et al. . |
| 4,711,071 | 12/1987 | Kagi . |
| 4,718,219 | 1/1988 | Schmitz . |
| 4,725,009 | 2/1988 | Fahrbackh . |
| 4,733,521 | 3/1988 | Weder et al. . |
| 4,768,276 | 9/1988 | Harlow . |
| 4,773,182 | 9/1988 | Weder et al. . |
| 4,794,832 | 1/1989 | Trimble . |
| 4,835,834 | 1/1989 | Weder . |
| 4,989,396 | 2/1991 | Weder et al. . |
| 5,085,003 | 2/1992 | Garcia . |
| 5,105,599 | 4/1992 | Weder .............. 53/399 |
| 5,111,638 | 5/1992 | Weder . |
| 5,161,348 | 11/1992 | Weder .............. 53/399 |
| 5,181,364 | 1/1993 | Weder . |
| 5,199,242 | 4/1993 | Weder et al. ........... 53/397 |
| 5,259,106 | 11/1993 | Weder et al. .......... 53/397 X |

OTHER PUBLICATIONS

Rubber Band Technology, Ltd. Yakima, Wash., Bandmaster 102 Model ET Oct. 1988.

Strapak, Inc., Tokyo, Japan, Sivaron S-661 & 661Y. Copyright 1984 Strapack Corp.

Strapack Inc., Tokyo, Japan, Strapack Semiautomatic Strapping Kit. Copyright 1988 Strapack Corp.

Universal Strapping Corp., Uni-Pac Portable Strapping Kit, no date.

Cyklop Strapping Corp. Downingtown, Pa., Cyklop EM-15, 2 pages. Copyright 1987 Cyklop Strapping Corporation.

Strapex Corp., Charlotte, N.C., How to Strap Without Getting in a Bind, 2 pages, no date.

(List continued on next page.)

OTHER PUBLICATIONS

Cyklop Strapping Corp., Downingtown, Pa., ASM Series, 2 pages, Copyright 1988 Cyklop Strapping Corporation.

Strapak Corp., Tokyo, Japan, Strapack Semi-Automatic Strapping Machine, Sivaron S-662, 2 pages, no date.

Strapack Corp., Tokyo, Japan, Strapack Semi-Automatic Polypropylene Strapping Machine, Sivaron SS-40, 2 pages, no date.

Strapack Corp., Tokyo, Japan, Strapack Semi-Automatic Strapping Machines, Sivaron S-661 S661L, 2 pages, no date.

Universal Strapping Corp., Brooklyn, N.Y., Universal Strapping Machine, 2 pages, no date.

Universal Strapping Corp., Brooklyn, N.Y., Universal Strapping Extruders of Plastic Strapping, 8 pages, no date.

Malow Corp., Mount Prospect, Ill., Heavy Duty Tyer, 2 pages, no date.

Rubber Band Technology, Ltd., Uakima, Wash., Band Master 101, Model MF, 1 page, no date.

Rubber Band Technology, Ltd., Yakima, Wash. Band Master 103, Model ET, 1 page, no date.

Rubber Band Technology, Ltd. Yakima, Wash., Band Master 201 Model B, 1 page, no date.

B. H. Bunn Company, ALSIP, Ill., Strapping Efficiency for Every Strapping Application, Brochure, M20M-475, 6 pages, no date.

B. H. Bunn Company, Lakeland, Fl., Bunn Models 1691, 1991, 2091, 2491 and 3091 Tying Machines Brochure, copyright 1992, 3 pages.

EAM Industries, W. Hazelton, Pa. EAM MOSCA Strapping System Brochure, 6 pages, no date.

EAM Industries, W. Hazelton, Pa., COM Taping Machine Brochure, 2 pages, no date.

Clements Industries, Inc., South Hackensack, N.J., TACH-IT (1 page) Twisters, Packaging Machines... Bag Openers... Tape, 1986.

Clements Industries, Inc., South Hackensack, N.J., Tach-It Twisters, Model 3558 Advertisement, 1 page, 1986.

Interpower Packaging, Hodgkins, Ill., Akebono OB-300 Brochure, 2 pages, no date.

Interpower Packaging, Hodgkins, Ill., Power 260 Brochure, two pages, 1991.

The John Henry Company, Cellocoup Brochure, copyright 1992, 4 pages.

Saxmayer Corporation, St. Blissfield, Mich., Twine Tying Machines Brochure, 7 pages, no date.

Saxmayer Corporation, St. Blissfield, Mich., Model 6 String Tyer Brochure, 2 pages, no date.

Saxmayer Corporation, St Blissfield, Mich., Model EM Route-Master Brochure, 2 pages, no date.

Felins, Inc., Milwaukee, Wis., Pak-Tyer 2000 Brochure, 4 pages, 1991.

Ex. A-Color Them Happy with Highlander Products, ©1992, 2 pages.

Ex. B-Super Seller, Supermarket Floral, Sep. 15, 1992.

Ex. C-Costa Keeps with Christmas Spirit, Supermarket, Sep. 15, 1992.

Ex. D-Now, More Than Ever, Supermarket Floral, Sep. 15, 1992.

Ex. E-Halloween, Link Magazine, Sep. 1992, 2 pages.

Ex. F-Speed Cover ® Brochure-The Simple Solution..., ©1989.

Ex. G-Speed Sheets and Speed Rolls Brochure, ©1990.

Ex. H-A World of Cut Flower and Pot Plant Packaging, 6 pages.

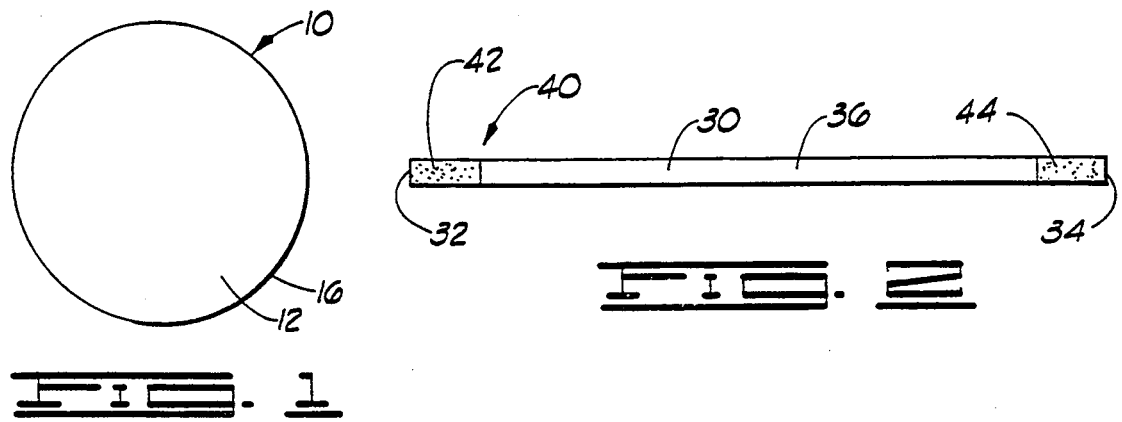
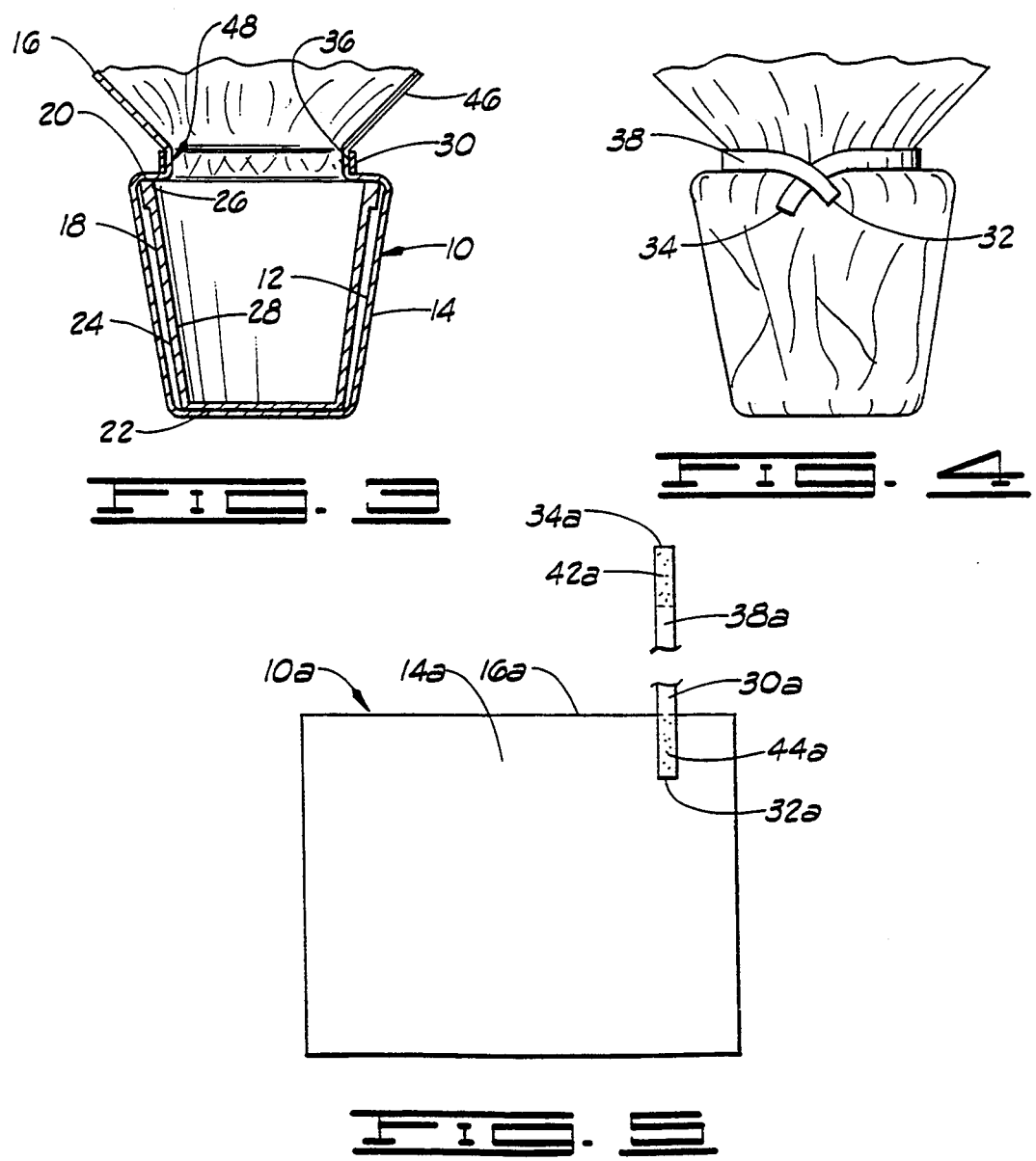

DECORATIVE COVER WITH BAND

This application is a continuation-in-part of U.S. Ser. No. 07/926,098, entitled, FLOWER POT COVER WITH CRIMPED PORTION, filed on Aug. 5, 1992; said application is a continuation-in-part of U.S. Ser. No. 07/819,311, entitled, MEANS FOR SECURING A DECORATIVE COVER ABOUT A FLOWER POT, filed on Jan. 9, 1992, now abandoned; said application is a continuation-in-part of U.S. Ser. No. 07/876,947, entitled, WRAPPING MATERIAL FOR PROVIDING A DECORATIVE COVERING, filed on May 1, 1992.

FIELD OF THE INVENTION

The present invention relates generally to decorative coverings for flower pots and, more particularly, but not by way of limitation, to a decorative covering comprising the sheet of material extended about the flower pot with a band extended about a portion of the sheet of material and connected to the sheet of material for forming a crimped portion in the sheet of material for cooperating to hold the sheet of material in the position extended about the flower pot.

BRIEF DESCRIPTION OF THE DRAWINGS

FIG. 1 is a plan view of a sheet of material constructed in accordance with the present invention.

FIG. 2 is a plan view of a band constructed in accordance with the present invention.

FIG. 3 is a sectional view of a flower pot having the sheet of material of FIG. 1 extended thereabout and the band of FIG. 2 extended about the sheet of material in accordance with the present invention.

FIG. 4 is a view similar to FIG. 3, but showing a perspective view of the sheet of material extended about the flower pot with the band extended about a portion of the sheet of material.

FIG. 5 is a plan view of a modified sheet of material having a modified band connected thereto.

DESCRIPTION OF THE PREFERRED EMBODIMENTS

Shown in FIG. 1 and designated therein by the general reference numeral 10 is a sheet of material constructed in accordance with the present invention. The sheet of material 10 has an upper surface 12, a lower surface 14 (FIG. 3) and an outer periphery 16.

The sheet of material 10 is constructed from any suitable flexible material that is capable of being wrapped or formed or extended about a flower pot 18 (FIG. 3), as described herein. Preferably, the sheet of material 10 is constructed of a material selected from a group of materials consisting of paper, metal foil, cloth (natural or synthetic), denim, burlap, polymer film or cling material or combinations thereof.

The term "polymer film" as used herein means any polymer film. For example, but not by way of limitation, one polymer film is a polypropylene film. Another example of a polymer film, but not by way of limitation, is cellophane.

The sheet of material 10 has a thickness in a range from about 0.1 mils to about 30 mils. Preferably, the sheet of material 10 has a thickness in a range from about 0.1 mils to about 5 mils.

The sheet of material 10 may be any shape and a circular shape is shown in FIG. 1 only by way of example. The sheet of material 10 for example only may be square or rectangular or any other geometric shape such as heart shaped for example only.

The sheet of material 10 may be constructed of a single layer of material or a plurality of layers of the same or different types of materials. Any thickness of the sheet of material 10 may be utilized in accordance with the present invention as long as the sheet of material 10 is wrappable about the flower pot 18, as described herein. Additionally, an insulating material such as bubble film, preferable as one of two or more layers, can be utilized in order to provide additional protection for the item wrapped therein. The layers of material comprising the sheet of material 10 may be connected together or laminated or may be separate layers.

A decorative pattern, such as a color and/or an embossed pattern, and/or other decorative surface ornamentation may be applied to the upper surface 12 and/or the lower surface 14 of the sheet of material 10 or portions thereof including, but not limited to printed design, coatings, colors, flocking or metallic finishes. The sheet of material 10 also may be totally or partially clear or tinted transparent material.

"Cling Wrap or Material" as used herein means any material which is capable of connecting to the sheet of material and/or itself upon contacting engagement during the wrapping process and is wrappable about an item whereby portions of the cling material contactingly engage and connect to other portions of the wrapping material for generally securing the sheet of material wrapped about at least a portion of the item. This connecting engagement is preferably temporary in that the wrapping material may be easily removed without tearing same, i.e., the cling material "clings" to the wrapping material. A wrapping material which remains securely connected to and about the wrapped item until the wrapping material is torn therefrom.

The cling material is constructed and treated if necessary, from polyethylene such as Cling Wrap made by Glad®, First Brands Corporation, Danbury, Conn. The thickness of the cling material will, in part, depend upon the thickness of the sheet of material utilized, i.e., generally, the thicker and therefore heavier sheet of material may require a thicker and therefore stronger cling material. The cling material will range in thickness from less than about 0.2 mils to about 10 mils, and preferably less than about 0.5 mils to about 2.5 mils and most preferably from less than about 0.6 mils to about 2 mils. However, any thickness of cling material may be utilized in accordance with the present invention which permits the cling material to function as described herein.

A flower pot 18, as shown in FIG. 3, has an upper end 20, a lower end 22 and an outer peripheral surface 24. A pot opening 26 is formed through the upper end 20 thereof and the pot opening 26 extends a distance through the flower pot 18 forming an inner peripheral surface 28. The flower pot 18 may be constructed in any manner now known or hereafter known. The flower pot 18 is capable of holding growing medium and a floral grouping in any manner commonly known in the art. The flower pot 18 for example may hold earth and a potted plant or flower. The flower pot 18 may also hold water and cut flowers in a manner similar to that commonly associated with a vase. Although the term "flower pot" as used herein it should be understood that the flower pot 18 may be a conventional flower pot or may be what is commonly referred in the art as a vase or any other device for holding a floral grouping.

"Floral grouping" as used herein means cut fresh flowers, artificial flowers, a single flower, other fresh and/or artificial plants or other floral materials and may include other secondary plants and/or ornamentation which add to the aesthetics of the overall floral grouping.

Shown in FIG. 2 is a band 30 constructed in accordance with the present invention. The band 30 has a first end 32 and a second end 34. The band 30 is an elongated, flat strip of flexible material having a rectangularly shaped cross section (FIG. 3). The band 30 preferably is constructed of any material capable of being wrapped about a portion of the sheet of material 10 in the manner described herein. Preferably the band 30 is constructed of a material selected from a group of materials consisting of paper, metal foil, cloth (natural or synthetic), denim, burlap, polymer film or cling material or combinations thereof. The band 30 has a thickness in a range from about 0.1 mils to about 30 mils. Preferably, the band 30 has a thickness in a range from about 0.1 mils to about 5.0 mils. In one preferred embodiment, the band 30 is constructed of the same material as the material utilized to construct the sheet of material. The band preferably is constructed of a sheet of flexible material.

As shown in FIG. 2, the band 30 has an upper surface 36 and a lower surface 38 (FIG. 4). A bonding material 40 is disposed on the upper surface 36 of the band 30. More particularly, a first bonding material 42 is disposed on the upper surface 36 of the band 30 near the first end 32. A second bonding material 44 is disposed on the upper surface 36 of the band 30 near the second end 34 of the band 30.

The term "bonding material" as used herein means an adhesive, preferably a pressure sensitive adhesive, or a cohesive. Where the bonding material is a cohesive, a similar cohesive material must be placed on the adjacent surface for bondingly contacting and bondingly engaging with the cohesive material. The term "bonding material" also includes materials which are heat sealable and, in this instance, the adjacent portions of the material must be brought into contact and then heat must be applied to effect the seal. The term "bonding material" as used herein also means a heat sealing lacquer which may be applied to the sheet of material and, in this instance, heat also must be applied to effect the sealing. The term "bonding material" as used herein means any type of material or thing which can be used to effect the bonding or connecting of the band 30 to either a portion of the band 30 or a portion of the sheet of material 10 or both.

In operation, the sheet of material 10 is extended about the outer peripheral surface 24 of the flower pot 18, as shown in FIGS. 3 and 4. The upper surface 12 of the sheet of material 10 is disposed adjacent the outer peripheral surface 24 of the flower pot 18. A portion of the sheet of material 10 near the outer periphery 16 thereof extends a distance above the upper end 20 of the flower pot 18 to form a skirt portion 46 extending above the upper end 20 of the flower pot 18.

With the sheet of material 10 extended about the outer peripheral surface 24 of the flower pot 18, the first end 32 of the band 30 is bondingly connected to a portion of the sheet of material 10 by disposing the upper surface 36 of the band 30 near the first end 32 thereof adjacent a portion of the lower surface 14 of the sheet of material 10 and bondingly connecting the first end 32 of the band 30 to the sheet of material 10 via the first bonding material 42. The band 30 then is extended about a portion of the sheet of material 10 pulling or drawing the sheet of material 10 inwardly toward a central portion of the pot opening 26 and forming a crimped portion 48 (FIG. 3) in the sheet of material 10. The second end 34 of the band 30 then is bondingly connected to either a portion of the band 30 or a portion of the sheet of material 10 by disposing the second bonding material 44 adjacent either a portion of the band 30 or a portion of the lower surface 14 of the sheet of material 10 for bondingly connecting the second end 34 of the band 30 to either the band 30 or the sheet of material 10.

The crimped portion 48 extends circumferentially about the upper end 20 of the flower pot 18. Preferably, the band 30 is placed about the sheet of material 10 in a position where the crimped portion 48 is formed and positioned above the upper end 20 of the flower pot 18 with the crimped portion 48 extending circumferentially about the upper end 20 of the flower pot 18. The crimped portion 48 cooperates to hold the sheet of material 10 in the position extended about the outer peripheral surface 24 of the flower pot 18 to provide the decorative covering. The band 30 is secured to the sheet of material 10 and/or the portions of the band 30 to hold the band 30 in the position extending about a portion of the sheet of material 10 and forming the crimped portion 48.

EMBODIMENT OF FIG. 5

Shown in FIG. 5 is a modified sheet of material 10a which is constructed exactly like the sheet of material 10 shown in FIG. 1 and described in detail before, except the sheet of material 10a is generally rectangularly shaped. Also shown in FIG. 5 is a modified band 30a which is constructed exactly like the band 30 shown in FIG. 2 and described in detailed before, except the first end of the band 30 is secured to the sheet of material via the bonding material 42a prior to the sheet of material 10a being wrapped about the flower pot. It should be noted that the band 30a may be integrally formed with the sheet of material rather than securing the band 30a to the sheet of material via the first bonding material 42a if desired in a particular application.

The sheet of material 10a and band 30a will operate in the manner described before in connection with the sheet of material 10 in the band 30 shown in FIGS. 1–4, except the first end 32a of the band 30 already is connected to the sheet of material 10a prior to wrapping the sheet of material 10a about the flower pot 18. Thus, when the sheet of material 10a is wrapped or extended about the flower pot 18, the band 30a already is in position to be wrapped about a portion of the sheet of material and secured to the sheet of material 10a or a portion of the band 30 to form the crimped portion in a manner like that described before in connection with the crimped portion 48. In this embodiment, the band 30 extends a distance beyond the outer periphery 16a of the sheet of material 10a prior to the sheet of material 10a being formed about the flower pot.

Changes may be made in the construction and the operation of the various components, elements and assemblies described herein and changes may be made in the steps or the sequence of steps of the methods described herein without departing from the spirit and scope of the invention as defined in the following claims.

What is claimed is:

1. A method for providing a decorative covering for use with a flower pot means having an upper end, a lower end, an outer peripheral surface and a flower pot means opening extending through the upper end thereof and extending into the flower pot means forming an inner peripheral surface, comprising:

providing a sheet of material having an upper surface, a lower surface and an outer periphery;

providing a band having a first end and a second end and a bonding material disposed on at least a portion thereof;

extending the sheet of material about at least a portion of the outer peripheral surface of the flower pot means with the upper surface of the sheet of material being disposed about adjacent the outer peripheral surface of the flower pot means and with a portion of the sheet of material extending above the upper end of the flower pot means; and connecting the first end of the band to the sheet of material via the bonding material and extending the band about the portion of the sheet of material extending above the upper end of the flower pot means and pulling a portion of the sheet of material inwardly forming a crimped portion in the sheet of material at a position above the upper end of the flower pot means and connecting the second end of the band to either a portion of the band or a portion of the sheet of material via the bonding material for securing the band in the position extending about the portion of the sheet of material, the crimped portion being engageable with the upper end of the flower pot means for cooperating to hold the sheet of material in the position extending about the flower pot means to provide the decorative covering.

2. The method of claim 1 wherein the step of providing the band is defined further as providing the band constructed of a flexible material selected from a group of materials consisting of paper, metal foil, cloth (natural or synthetic), denim, burlap, polymer film or cling material or combinations thereof.

3. The method of claim 1 wherein the step of providing the band is defined further as providing the band having a thickness in a range from about 0.1 mils to about 30 mils.

4. The method of claim 3 wherein the step of providing the band is defined further as providing the band having a thickness in a range from about 0.1 mils to about 5 mils.

5. The method of claim 1 wherein the step of extending the band about the portion of the sheet of material and forming the crimped portion is defined further as forming the crimped portion extending radially inwardly toward a central portion of the flower pot means opening with the crimped portion extending circumferentially about the flower pot means opening.

6. A method comprising:

providing a flower pot means having an upper end, a lower end, an outer peripheral surface and a flower pot means opening extending through the upper end thereof and extending into the flower pot means forming an inner peripheral surface;

providing band having a first end and a second end and a bonding material disposed on at least a portion thereof;

extending the sheet of material about at least a portion of the outer peripheral surface of the flower pot means with the upper surface of the sheet of material being disposed about adjacent the outer peripheral surface of the flower pot means; and connecting the first end of the band to the sheet of material via the bonding material and extending the band about the portion of the sheet of material and pulling a portion of the sheet of material inwardly forming a crimped portion in the sheet of material and connecting the second end of the band to either a portion of the band or a portion of the sheet of material via the bonding material for securing the band in the position extending about the portion of the sheet of material.

7. The method of claim 6 wherein the step of providing the band is defined further as providing the band constructed of a flexible material selected from a group of materials consisting of paper, metal foil, cloth (natural or synthetic), denim, burlap, polymer film or cling material or combinations thereof.

8. The method of claim 6 wherein the step of providing the band is defined further as providing the band having a thickness in a range from about 0.1 mils to about 30 mils.

9. The method of claim 6 wherein the step of providing the band is defined further as providing the band having a thickness in a range from about 0.1 mils to about 5 mils.

10. The method of claim 6 wherein the step of extending the band about the portion of the sheet of material and forming the crimped portion is defined further as forming the crimped portion extending radially inwardly toward a central portion of the flower pot means opening with the crimped portion extending circumferentially about the flower pot means opening.

11. A method comprising:

providing a flower pot means having an upper end, a lower end, an outer peripheral surface and a flower pot means opening extending through the upper end thereof and extending into the flower pot means forming an inner peripheral surface;

providing a sheet of material having an upper surface, a lower surface and an outer periphery;

providing a band having a first end and a second end and a bonding material disposed on at least a portion thereof; and extending the sheet of material about at least a portion of the outer peripheral surface of the flower pot means; and connecting the first end of the band to the sheet of material via the bonding material and extending the band about the portion of the sheet of material and connecting the second end of the band to either a portion of the band or a portion of the sheet of material via the bonding material for securing the band in the position extending about the sheet of material.

12. The method of claim 11 wherein the step of providing the band is defined further as providing the band having a thickness in a range from about 0.1 mils to about 30 mils.

13. The method of claim 11 wherein the step of providing the band is defined further as providing the band having a thickness in a range from about 0.1 mils to about 5 mils.

14. A method comprising:

providing a flower pot means having an upper end, a lower end, an outer peripheral surface and a flower pot means opening extending through the upper end thereof and extending into the flower pot means forming an inner peripheral surface;

providing a sheet of material having an upper surface, a lower surface and an outer periphery;

providing band having a first end and a second end and a bonding material disposed on at least a portion thereof; and extending the sheet of material about the outer peripheral surface of the flower pot means with the upper surface of the sheet of material being disposed about adjacent the outer peripheral surface of the flower pot means and with a portion of the sheet of material extending above the upper end of the flower pot means; and connecting the first end of the band to the sheet of material via the bonding material and extending the band about at least a portion of the portion of the sheet material extending above the upper end of the flower pot means and pulling a portion of the sheet of material inwardly forming a crimped portion in the sheet of material at a position above the upper end of the flower pot means, and connecting the second end of the band to either a portion of the band or a portion of the sheet of material via the bonding material for securing the band in position extending about the portion of the sheet of material, the crimped portion being engageable with the upper end of the flower pot means for cooperating to hold the sheet of material in the position extending about the flower pot means to provide the decorative covering.

15. The method of claim 14 wherein the step of providing the band is defined further as providing the band constructed of a flexible material selected from a group of materials consisting of paper, metal foil, cloth (natural or synthetic), denim, burlap, polymer film or cling material or combinations thereof.

16. The method of claim 15 wherein the step of providing the band is defined further as providing the band having a thickness in a range from about 0.1 mils to about 30 mils.

17. The method of claim 14 wherein the step of providing the band is defined further as providing the band having a thickness in a range from about 0.1 mils to about 5 mils.

18. The method of claim 14 wherein the step of extending the band about the portion of the sheet of material and forming the crimped portion is defined further as forming the crimped portion extending radially inwardly toward a central portion of the flower pot means opening with the crimped portion extending circumferentially about the flower pot means opening.

* * * * *

UNITED STATES PATENT AND TRADEMARK OFFICE
CERTIFICATE OF CORRECTION

PATENT NO. : 5,339,601

DATED : August 23, 1994

INVENTOR(S) : Donald E. Weder et al.

It is certified that error appears in the above-identified patent and that said Letters Patent is hereby corrected as shown below:

On the title page,
In [56] References Cited, U.S. Patent Documents, Page 2, Second Column, Line 9, please delete "4,544,779" and substitute therefor --4,554,779--.

Column 6, Line 5, please delete the first occurence of the word "the" and substitute therefor --a--.

Column 6, Line 50, please delete the first occurence of the word "the" and substitute therefor --a--.

Column 7, Line 18, after the word "sheet" please insert the word --of--.

Signed and Sealed this

Tenth Day of January, 1995

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,339,601
DATED : August 23, 1994
INVENTOR(S) : Donald E. Weder et al.

It is certified that error appears in the above-identified patent and that said Letters Patent is hereby corrected as shown below:

Title Page, under 'Related U.S. Application Data, Item: [63]', line 2, delete "which", and substitute therefor --said application--.

Title Page, under 'Related U.S. Application Data, Item: [63]', line 4, delete "which", and substitute therefor --and said application--.

Signed and Sealed this

Twenty-first Day of May, 1996

Attest:

BRUCE LEHMAN

Attesting Officer

Commissioner of Patents and Trademarks